United States Patent [19]
Muraji

[11] Patent Number: 5,088,286
[45] Date of Patent: Feb. 18, 1992

[54] CONTROL SYSTEM FOR TURBOCHARGER WITH ROTARY ELECTRIC MACHINE

[75] Inventor: Hiroshi Muraji, Yokohama, Japan

[73] Assignee: Isuzu Motors Limited, Tokyo, Japan

[21] Appl. No.: 589,544

[22] Filed: Sep. 28, 1990

[30] Foreign Application Priority Data

Sep. 29, 1989 [JP] Japan .................. 1-254499

[51] Int. Cl.$^5$ ............................. F02B 37/14
[52] U.S. Cl. .................................... 60/608
[58] Field of Search ............... 60/600, 601, 602, 603, 60/607, 608

[56] References Cited

U.S. PATENT DOCUMENTS 4,571,945 2/1986 Inada et al. ................. 60/602

FOREIGN PATENT DOCUMENTS 79100  5/1983  European Pat. Off. .
311457 4/1989  European Pat. Off. .

*Primary Examiner*—Michael Koczo
*Attorney, Agent, or Firm*—Staas & Halsey

[57] ABSTRACT

A control system controls a turbocharger which incorporates a rotary electric machine operable as a motor or a generator. When the rotary electric machine operates as a motor using supplied electric power, the control system controls the amount by which the electric power is to be reduced or increased, depending on the rate of change of the rotational speed of the turbocharger within a speed control range for the turbocharger, thereby reducing the degree by which the rotational speed of the turbocharger varies.

9 Claims, 5 Drawing Sheets

CONTROL SYSTEM FOR TURBOCHARGER WITH ROTARY ELECTRIC MACHINE

BACKGROUND OF THE INVENTION

1. Field of the Invention:

The present invention relates to a system for controlling a turbocharger mounted in an internal combustion engine, the turbocharger having a rotary electric machine mounted on the rotatable shaft thereof and operable as a motor-generator which functions as a motor or a generator.

2. Description of the Related Art:

Since exhaust gases are high in temperature and pressure various methods and systems have been proposed for recovering the energy of exhaust gases emitted from internal combustion engines as drive power or electric power. One such exhaust energy recovery system, which is disclosed in Japanese Laid-Open Patent Publication No. 63(1988)-272909, has a rotary electric machine, operable as a motor-generator, mounted on a turbine shaft that can be driven by the energy of exhaust gases. Supercharging operation of the rotary electric machine and fuel supply are controlled on the basis of the load condition of the engine and the depression of the accelerator pedal.

FIG. 4 of the accompanying drawings schematically shows the exhaust energy recovery system disclosed in the above publication. An engine 1 has an exhaust pipe 1b and an intake pipe 1a which are connected respectively to a turbine 2b and a compressor 2a of a turbocharger 2. A rotary electric machine 3, operable as a motor-generator, is mounted on a rotatable turbine shaft 2c of the turbocharger 2.

A battery 5 is connected to a controller 6 which comprises a microcomputer and has a power electric device as an input/output circuit. Depending on signals from an accelerator pedal movement sensor 1c, an engine load sensor 1d, an engine rotation sensor 1e, and a boost pressure sensor 1h, the controller 6 controls the rotary electric machine 3 as a motor with the electric power from the battery 5 increasing the boost pressure and amount of supplied fuel, based on the operating conditions of the engine 1. Therefore, when a high load is imposed on the engine 1, the engine 1 can be controlled to produce an engine output power corresponding to the maximum amount of depression of the accelerator pedal. As shown in the flowchart of FIG. 5, if in step (a) the amount of depression of the accelerator pedal is maximum, control goes to step (b). There is established a speed control range L (rpm)-H (rpm) in which the rotary electric machine 3 is to operate as a motor. If in step (b) the rotational speed of the turbocharger 2 (i.e., the rotational speed of the rotary electric machine 3) is lower than the lower level L (rpm), then the electric current supplied from the battery 5 is maximized in step (c). If in step (b) the rotational speed of the turbocharger 2 is higher than the lower level L (rpm), then control goes to step (d) which determines whether it is lower than the upper level H (rpm). If in step (d) the rotational speed of the turbocharger 2 is lower, than the higher level H (rpm), but in step (e) increasing, then control goes to step (f) in which the electric current supplied from the battery 5 is reduced. If the rotational speed of the turbocharger 2 decreases in the step (e), then control goes to a step (g) in which the electric current supplied from the battery 5 remains unchanged. If in step (d) the rotational speed of the turbocharger 2 reaches the upper level H (rpm), the supplied electric current is discontinued or reduced by a certain level, so that the rotational speed of the turbocharger 2 will not exceed the upper level H (rpm).

As described above, if the rotational speed of the turbocharger is lower than the lower level, then the supplied current is maximized to rotate the turbocharger at high speed irrespective of the degree by which the rotational speed of the turbocharger is lower than the lower level, and if the rotational speed of the turbocharger reaches the high level, then the supplied current is reduced to rotate the turbocharger at low speed irrespective of the degree by which the rotational speed of the turbocharger has increased up to the high level. As a result of this repeated rotational speed control process, the rotational speed of the turbocharger tends to vary in a wide range as shown in FIG. 6. The rotational speed of the turbocharger is controlled unstably because it does not converge in a smaller range.

SUMMARY OF THE INVENTION

It is an object of the present invention to provide a control system for operating a rotary electric machine mounted on the rotatable shaft of a turbocharger, as a motor while controlling the rotational speed of the turbocharger to remain in a speed control range with reduced speed variations or fluctuations.

According to the present invention, there is provided a control system for controlling a turbocharger mounted on an internal combustion engine on a motor vehicle. The turbocharger has a rotatable shaft on which a rotary electric machine is mounted and is energizable with supplied electric power to rotate the turbocharger to control the amount of supercharged intake air to be supplied to the engine. The control system has an accelerator pedal movement sensor for detecting depression of the accelerator pedal determine whether the depression is maximum or not, based on a signal from the accelerator pedal movement sensor. The control system supplies electric power to the rotary electric machine if the amount of depression of the accelerator pedal is determined as being maximum. A rotation sensor detects a rotational speed of the turbocharger, and the system calculates a rate of change of the rotational speed based on a signal from the rotation sensor. The amount by which the electric power supplied to the rotary electric machine is to be reduced or increased is calculated depending on the rate of change of the rotational speed.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
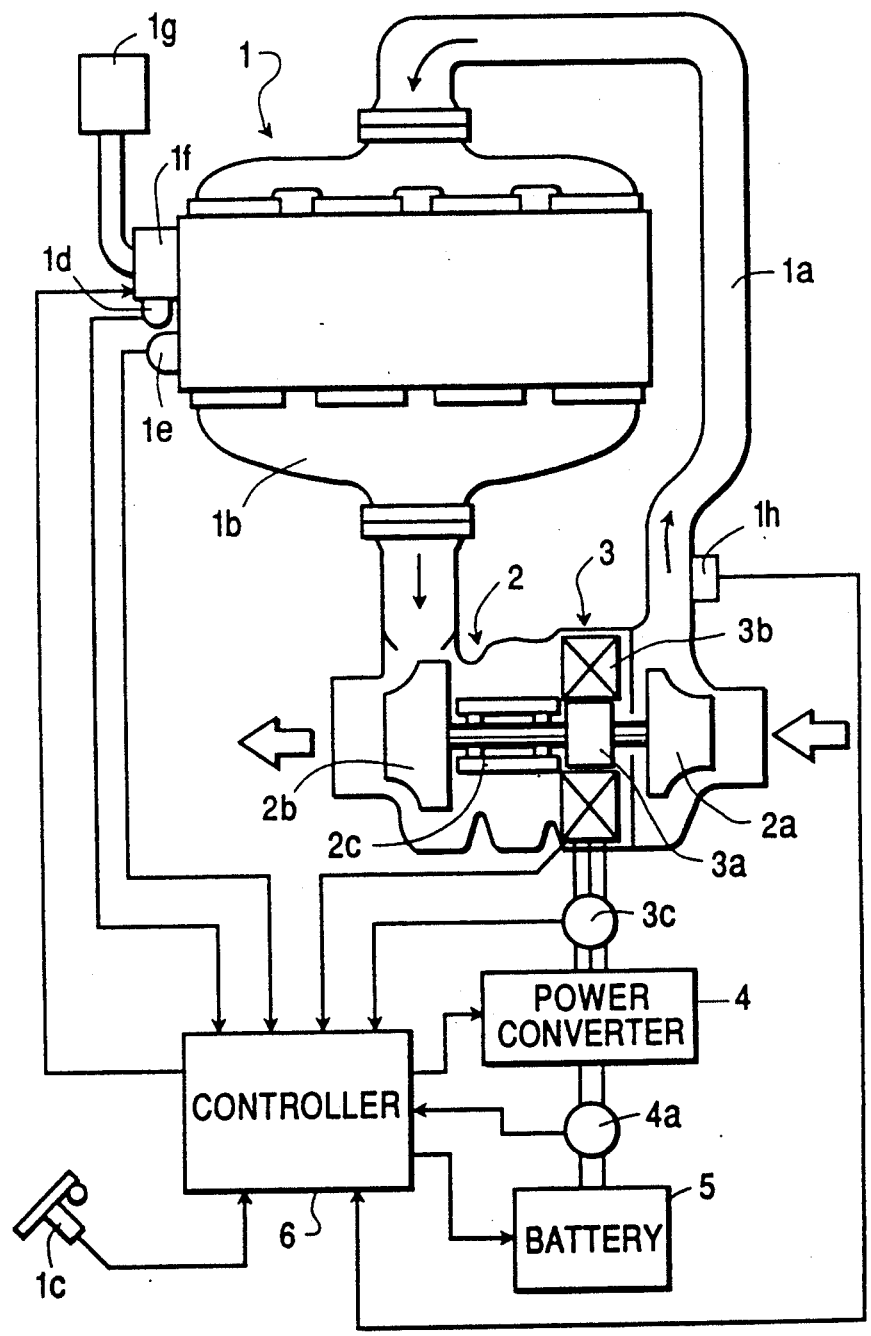
FIG. 1 illustrates a system for controlling a turbocharger which incorporates a rotary electric machine, according to the present invention.

FIG. 1 illustrates a control system for controlling a turbocharger with a rotary electric machine, according to the present invention.

As shown in FIG. 1, an engine 1 drives a motor vehicle (not shown) with the energy produced upon combustion of fuel supplied from a fuel tank 1g by an injection pump 1f with the aid of air drawn from an intake pipe 1a. Exhaust gases produced when the fuel is combusted are discharged through an exhaust pipe 1b. The engine 1 is associated with an accelerator pedal movement sensor 1c for detecting the amount of depression of an accelerator pedal, a load sensor 1d for detecting the rack position of the fuel pump 1f, and thus, the amount of fuel supplied to the engine 1, and an engine rotation sensor 1e for detecting the rotational speed of the engine 1. Signals detected from these sensors 1c, 1d, 1e are transmitted to a controller 6.

A turbocharger 2 is connected to the exhaust pipe 1b and the intake pipe 1a and has a turbine 2b rotatable by the exhaust gases and a compressor 2a for supplying air under pressure to the intake pipe 1a. The turbine 2b and the compressor 2a are mechanically coupled to each other by a rotatable shaft 2c on which there is mounted a rotary electric machine 3 that is operable as a motor or a generator.

The rotary electric machine 3 has a rotor 3a supported on the rotatable shaft 2c and a stator 3b disposed around the rotor 3a. When the rotor 3a is rotated by turbine 2b driven by the exhaust gases, the stator 3b induces AC electric power which is transmitted through a power converter 4 to a battery 5. When the rotor 3a is rotated by electric power supplied from the battery 5 through the power converter 4 to the stator 3b, the compressor 2a rotates to compress intake air and charges compressed air through the intake air 1a into the engine 1. The pressure in the intake pipe 1a is detected by a boost pressure sensor 1h, which applies a signal that represents the boost pressure developed in the intake pipe 1a by the compressor 2a to the controller 6.

The power converter 4 serves to convert the AC electric power from the stator 3b into DC electric power to charge the battery 5 when the rotary electric machine 3 operates as a generator, or to convert DC electric power from the battery 5 into AC electric power to energize the rotary electric machine 3 as a motor. Therefore, the power converter 4 has rectifying and smoothing circuits for converting AC electric power into DC electric power, an inverter for converting DC electric power into AC electric power, and a power converter device such as a booster circuit. The frequency of AC electric power into which DC electric power is to be converted, and the voltage and magnitude of the AC electric power are controlled by commands from the controller 6. An AC meter 3c is connected between the stator 3b and the power converter 4, for measuring the voltage, current, and phase of the AC electric power converted by the power converter 4 and supplied to the stator 3b. A DC meter 4a is connected between the power converter 4 and the battery 5, for measuring the voltage and current of the DC electric power converted by the power converter 4. Measured values from the AC and DC meters 3c, 4a are sent to the controller 6.

The controller 6 comprises a microcomputer which has a central processing unit for calculating an amount of fuel to be supplied, a required amount of electric power, and a required boost pressure, based on operating conditions of the engine 1 and signals from the various sensors, a memory for storing the calculated values, a memory for storing control programs for the engine 1 and the rotary electric machine 3, and an input/output unit for receiving various input signals and transmitting various control signals. The rotational speed of the rotary electric machine 3, i.e., the rotational speed of the turbocharger 2, which is detected based on the frequency of a counterelectromotive force induced in the stator 3b when the rotary electric machine 3 rotates, is supplied to the controller 6.

Figure 2:
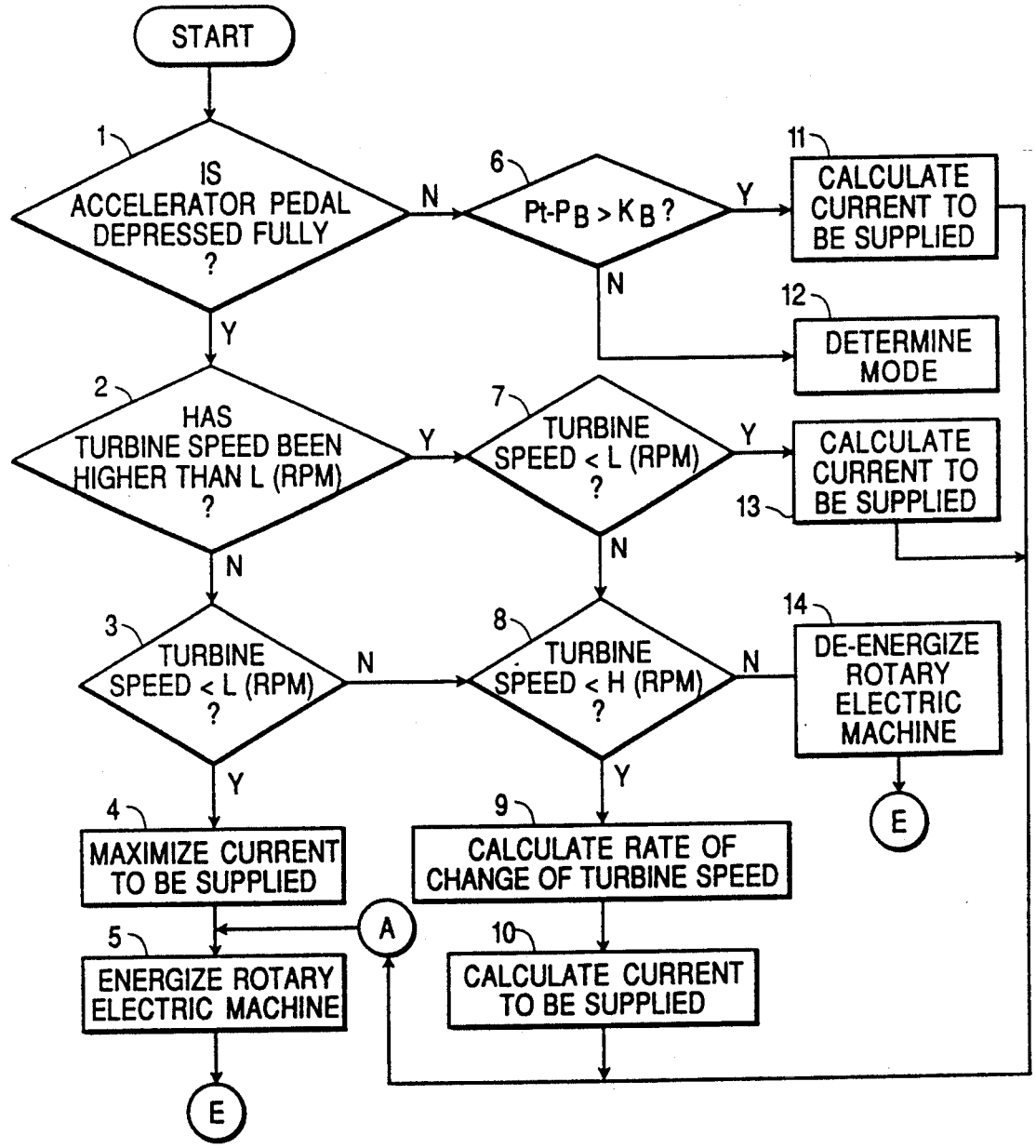
FIG. 2 is a flowchart of a control sequence of the system shown in FIG. 1.
Figure 3:
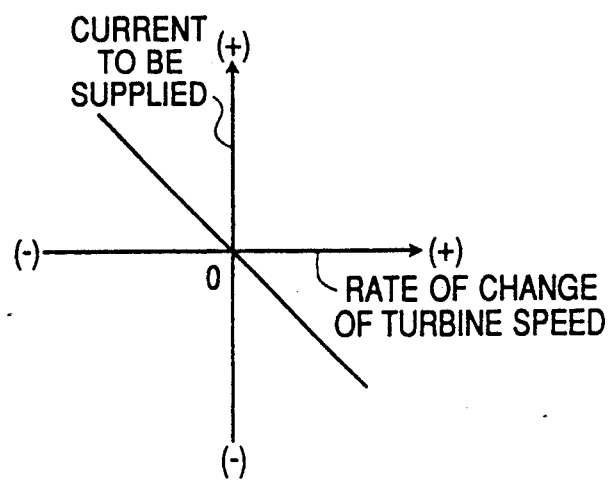
FIG. 3 is a diagram showing the relationship between the rate of change of the rotational speed of the turbocharger and the electric current supplied to the rotary electric machine.
Figure 6:
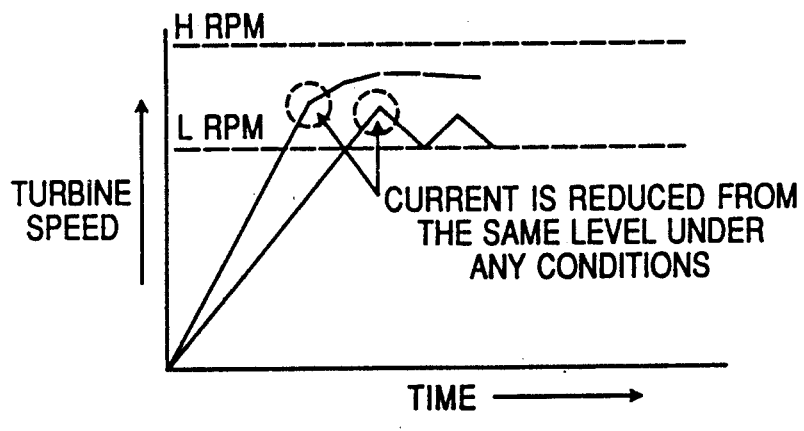
FIG. 6 is a diagram showing variations or fluctuations in the rotational speed of the turbocharger controlled by the conventional system show in FIG. 4.
Figure 4:
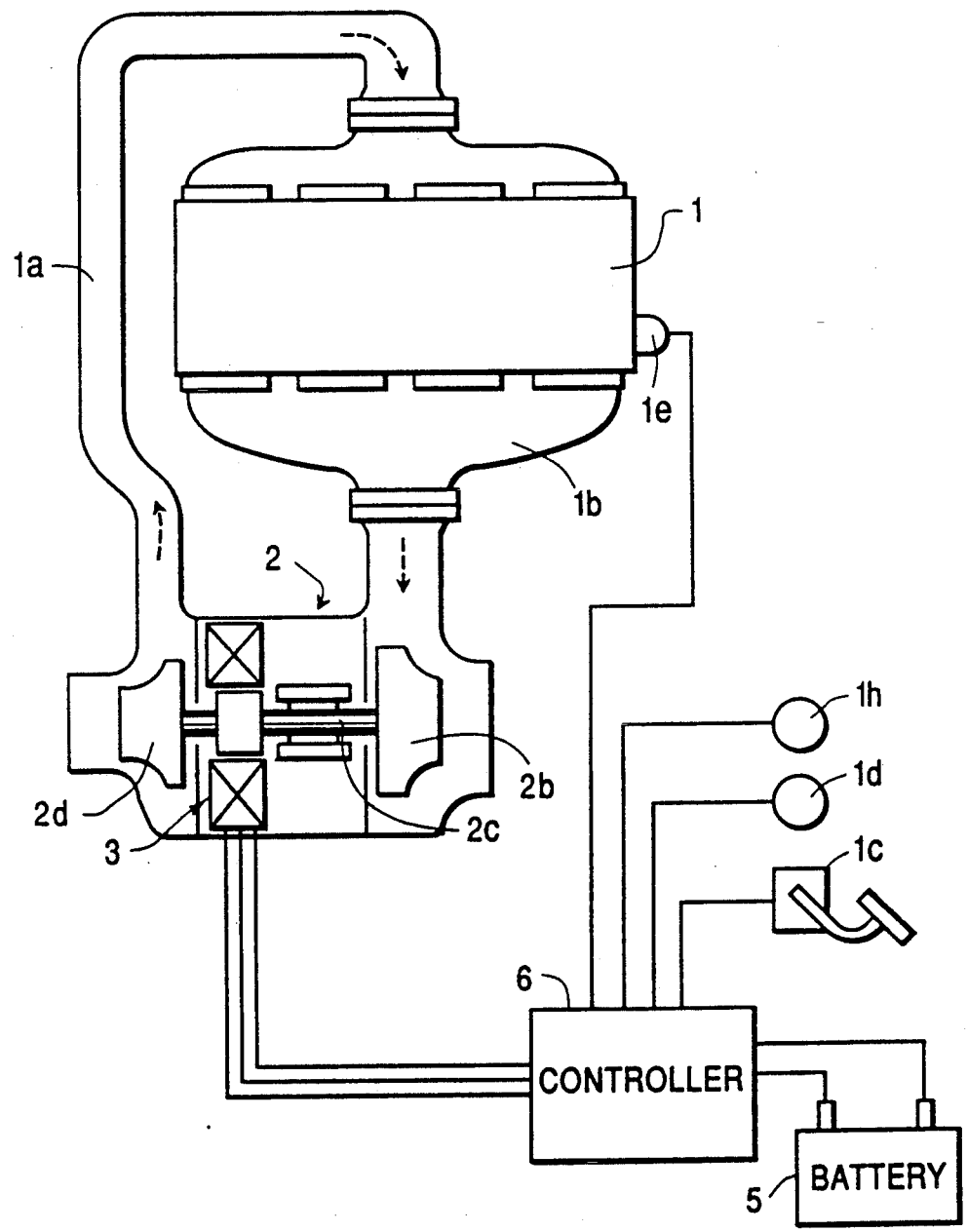
FIG. 4 is a schematic view, partly in block form, of a conventional system for controlling a turbocharger which incorporates a rotary electric machine.
Figure 5:
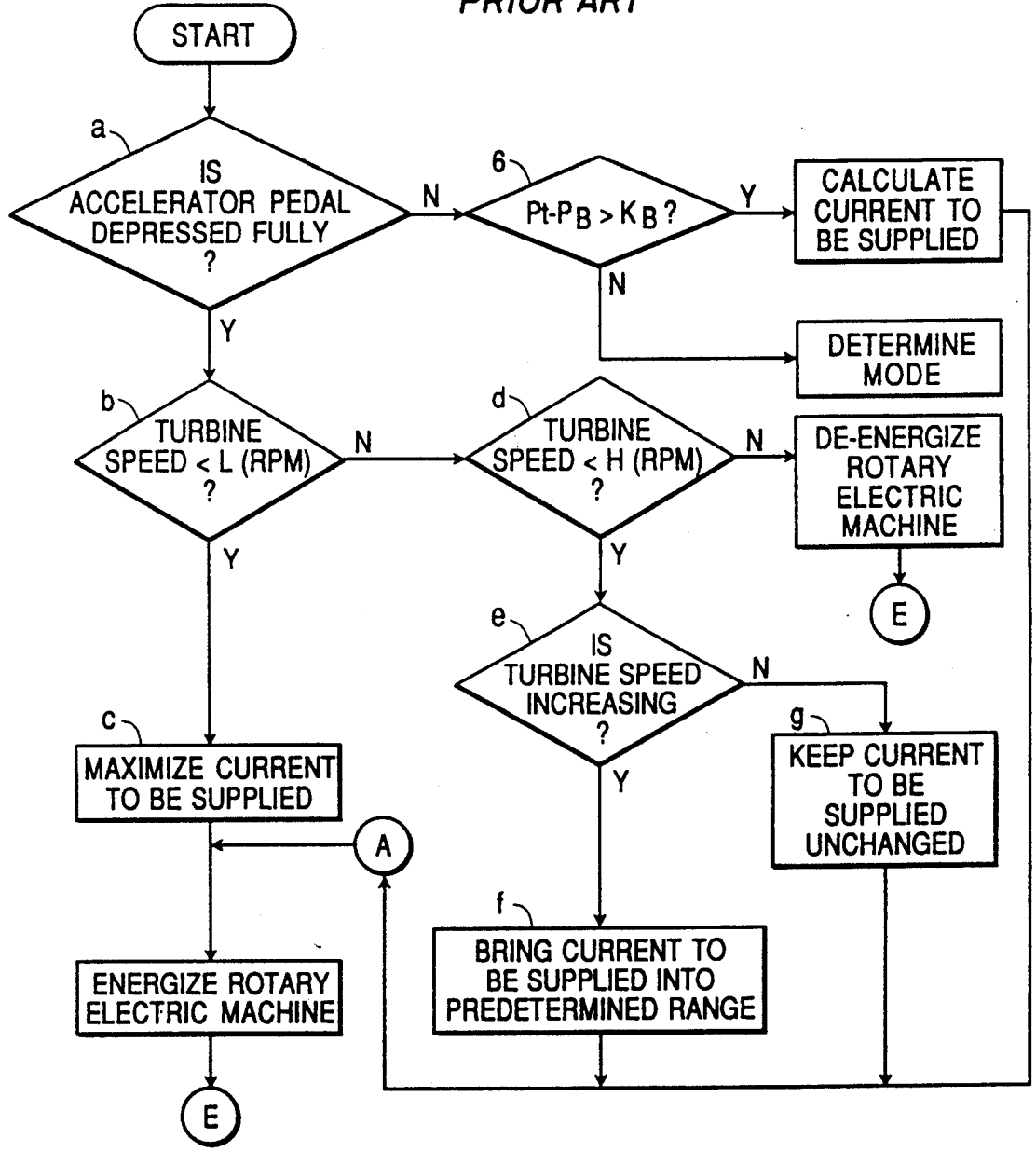
FIG. 5 is a flowchart of a control sequence of the system shown in FIG. 4.

FIG. 2 shows a control sequence of the control system shown in FIG. 1. FIG. 3 shows the relationship between an electric current supplied to the rotary electric machine 3 and a rate of change of the rotational speed of the rotary electric machine 3, i.e., the turbocharger 2. In FIG. 2, a step (1) determines whether the amount of depression of the accelerator pedal is maximum or not. If maximum, then control goes to a step (2), and if not, then control goes to a step (6). The step (6) compares a target boost pressure Pt, which is determined from the amount of depression of the accelerator pedal and the rotational speed of the engine 1, with an actual boost pressure PB. If the difference between the compared boost pressures Pt, PB is larger than a boost pressure difference KB used to determine acceleration (accelerating condition), then an electric current to be supplied, which corresponds to the boost pressure difference, is calculated in a step (11), and control goes to a flow (A). If the boost pressure difference is smaller than the boost pressure difference KB, then control goes to a step (12) for determining a mode.

If control goes from the step (1) to the step (2), the step (2) determines whether the rotational speed of the turbocharger 2 has been higher than L (rpm) (the lower limit level of a speed control range when the rotary electric machine 3 is to operate a motor) in the past. If yes, then control goes to a step (7) which determines whether present rotational speed of the turbocharger 2 is lower than L (rpm). If the rotational speed is lower than L (rpm), then control goes to a step (13) which determines an electric current to be supplied which corresponds to the rotational speed of the engine 1, and determines an electric current to be reduced or increased depending on the rate of change of the rotational speed of the turbocharger as shown in FIG. 3, for example, thereby calculating an electric current to be supplied. Thereafter, control goes to the flow (A).

If the rotational speed is higher than L (rpm) in the step (7), then the same process as when the rotational speed of the turbocharger 2 has not been higher than L (rpm) in the past is effected in a step (8), as described later.

If the rotational speed of the turbocharger 2 has not been higher than L (rpm) in the past in the step (2), then control goes from the step (2) to a step (3) which compares the present rotational speed of the turbocharger 2 with L (rpm). If the present rotational speed of the turbocharger is lower than L (rpm), then the electric current to be supplied to the rotary electric machine 3 is maximized in a step (4), and then the rotary electric machine 3 is energized with the maximum electric current in a step (5).

If the rotational speed of the turbocharger 2 is higher than L (rpm) in the step (3), then in step (8) the rotational speed of the turbocharger 2 is compared with H (rpm) (the upper limit level of the speed control range when the rotary electric machine 3 is to operate a motor). If the rotational speed has reached H (rpm), then the rotary electric machine 3 is de-energized in a step (14). If the rotational speed has not yet reached H (rpm), then a rate of change of the rotational speed of the turbocharger 2 is determined from the present rotational speed of the turbocharger 2 and the previous rotational speed thereof in a step (9). In a next step (10), a corresponding electric current to be reduced or increased is determined, thus calculating an electric current to be supplied in a step (10). The rotary electric machine 3 is energized with the calculated electric current according to the flow (A).

With the present invention, as described above, when the rotational speed of the turbocharger is in the speed control range, an appropriate reduced or increased electric current is supplied to the rotary electric machine depending on a rate of change, i.e., increase or reduction, of the rotational speed of the turbocharger. Therefore, the degree by which the rotational speed of the turbocharger varies is reduced. Since the electric current supplied to the rotary electric machine is suitably controlled, the consumption of electric power by the rotary electric machine is also reduced.

Although a certain preferred embodiment has been shown and described, it should be understood that many changes and modifications may be made therein without departing from the scope of the appended claims.

What is claimed is:

1. A control system for controlling a turbocharger of an internal combustion engine in a motor vehicle, the turbocharger having a rotatable shaft on which a rotary electric machine is mounted and the turbocharger being energized with supplied electric power to rotate the turbocharger to control the amount of supercharged intake air to be supplied to the engine, said control system comprising:
   an accelerator pedal movement sensor for detecting an amount of depression of an accelerator pedal which controls an amount of fuel to be supplied to the engine, said accelerator pedal movement sensor producing an acceleration signal;
   means for determining whether the amount of depression of the accelerator pedal is maximum based on the acceleration signal;
   means for supplying electric power to the rotary electric machine if the amount of depression of the accelerator pedal is determined as being maximum;
   a rotation sensor for detecting a rotational speed of the turbocharger and producing a rotation signal;
   means for calculating a rate of change of the rotational speed of the turbocharger, based on the rotation signal from said rotation sensor;
   means for calculating a power change amount by which the electric power to be supplied to the rotary electric machine is to be reduced or increased, depending on the rate of change of the rotational speed;
   means for setting a speed control range for the turbocharger; and
   means for controlling the electric power to be supplied to the rotary electric machine based on said power change amount when the rotational speed of the turbocharger is in said speed control range.

2. A control system according to claim 1, wherein said means for supplying electric power to the rotary electric machine comprises means for supplying maximum electric power to the rotary electric machine when the rotational speed of the turbocharger has not reached said speed control range.

3. A control system according to claim 1, wherein said means for supplying electric power to the rotary electric machine comprises means for cutting off the supply of electric power to the rotary electric machine when the rotational speed of the turbocharger has exceeded said speed control range.

4. A turbocharger control system for controlling a turbocharger to supply air to an engine having an accelerator, comprising:
   power supply means for supplying power to the turbocharger;
   a rotation sensor detecting the rotational speed of the turbocharger;
   calculation means for calculating a rate of change of said rotational speed; and
   control means for varying the power supplied by said power supply means corresponding to the rate of change calculated by said calculation means.

5. A turbocharger control system according to claim 4, further comprising:
   an accelerator sensor detecting whether the accelerator is fully depressed; and
   said power supply means supplying power only when the acceleration is maximized.

6. A turbocharger control system according to claim 4, wherein said power supply means supplies no power when said rotational speed exceeds a maximum amount.

7. A turbocharger control system according to claim 4, wherein said power supply means supplies maximum power when said rotational; speed does not reach a minimum amount, and varies said power supply means corresponding to the rate of change when said rotational speed falls below the minimum amount.

8. A method of controlling a turbocharger supplying air to an engine, comprising the steps of:
   (a) detecting a rotational speed of the turbocharger;
   (b) calculating a rate of change of the rotational speed; and
   (c) supplying power to the turbocharger varying based on the rate of change of the rotational speed.

9. A method according to claim 8, further comprising the steps of:
   (d) supplying no power to the turbocharger when the rotational speed exceeds a maximum amount;
   (e) supplying maximum power to the turbocharger when the rotational speed continues to fall below a minimum amount; and
   (f) supplying power to the turbocharger varying based on the rate of change of the rational speed when the rotational speed falls below the minimum amount.

* * * * *